United States Patent [19]

Kawamura

[11] 4,167,317
[45] Sep. 11, 1979

[54] CAMERA SHUTTER RELEASE MECHANISM

[75] Inventor: Kunio Kawamura, Sakai, Japan

[73] Assignee: Minolta Camera Kabushiki Kaisha, Osaka, Japan

[21] Appl. No.: 843,916

[22] Filed: Oct. 20, 1977

[30] Foreign Application Priority Data

Oct. 28, 1976 [JP] Japan .................. 51-130127

[51] Int. Cl.² .................. G03B 17/38
[52] U.S. Cl. .................. 354/269
[58] Field of Search ............ 354/67, 131, 234, 235, 354/266, 267, 269, 289; 352/179

[56] References Cited

U.S. PATENT DOCUMENTS

| | | | |
|---|---|---|---|
| 3,900,857 | 8/1975 | Tsujimoto | 354/50 |
| 3,946,408 | 3/1976 | Taguchi | 354/267 X |
| 4,051,496 | 9/1977 | Iida et al. | 354/266 X |

FOREIGN PATENT DOCUMENTS 1056474  4/1959  Fed. Rep. of Germany ........... 354/266

*Primary Examiner*—John Gonzales
*Attorney, Agent, or Firm*—Wolder, Gross & Yavner

[57] ABSTRACT

A shutter release mechanism is provided in a camera, which includes an electromagnetic circuit, in which an electric power source, an electromagnet for operating a shutter, and an actuating switch are operatively interconnected. Provided in the camera shutter release button is a coupling section, to which are selectively attachable the tip portion of a mechanical cable release and the tip portion of an electric remote control release having therein a manual operating switch. When the shutter release button is operated, or when the tip portion of the cable release is attached thereto and depressed, then a movable member provided internally of the camera is advanced so as to close the switch provided in the body of the camera, thereby mechanically operating the electro-magnetic release means. On the other hand, when the tip portion of the remote control release is attached and operated, then the electromagnetic release circuit is electrically operated by means of the manual switch provided internally of the remote control release, without mechanically operating the switch in the camera body.

11 Claims, 8 Drawing Figures

CAMERA SHUTTER RELEASE MECHANISM

BACKGROUND OF THE INVENTION

The present invention relates to improvements in shutter release mechanisms for use in a camera, which electromagnetically releases a shutter.

Recently there have been proposed cameras having an electromagnetic shutter release means wherein an electric circuit is actuated by the operation of a shutter button to actuate a magnet, thereby actuating the shutter.

A prior art camera of this type is so constructed that the electromagnetic shutter release device is actuated by a shutter release button being operated and by an electric remote control release means being operated. According to such a camera as illustrated in FIG. 1, electric control release 6 is coupled to a socket portion 2 for the electric releasing operation in response to the operation of a manual operating portion 5, the electric control release 6 consists of a coupling plug portion 3 adapted to be attached or plugged to socket portion 2, a contact for opening and closing an electromagnetic release circuit provided in the camera, and manual operating portion 5 adapted to switch contact 4 on and off.

However, with the camera of this type, the electric remote control release 6 is designed as to be attached to a separate socket which is provided independently of the shutter release button 1, so two or more operating portions are provided for the shutter release, with the result that the construction of the shutter release mechanism is complicated and the manufacturing cost thereof is increased.

In addition, such prior art camera is so constructed that only an electric remote control release can be used for shutter remote control release and the conventional or well known mechanical cable release cannot be used for that purpose. The photographer who possesses only a mechanical cable release cannot perform remote control release with such a camera and so is highly restricted in the performance of the shutter release operation.

Furthermore, in the prior art camera explained above, the coupling section for the electric control release is provided separately and apart from the shutter release button. Moreover, with the conventional camera having a mechanical shutter release mechanism, it is common that a coupling section for receiving a remote control means, such as a cable release member, is provided on the shutter release button. Hence, it may be difficult for the photographer who is an amateur or inexperienced in handling the above explained prior art camera to recognize the electric release coupling section or socket on such prior art camera, at the position other than on the release button. Thus, he might not be able to perform photography with the remote control release when he should require it.

SUMMARY OF THE INVENTION

It is accordingly an object of the present invention to provide an improved shutter release mechanism in which a mechanical cable release or an electric remote control release may selectively alternatively be operatively connected to a single coupling section thereby simplifying the construction of the camera and reducing the manufacturing cost thereof.

Another object of the present invention is to provide the coupling section for the mechanical cable or electric remote control release on the camera shutter release member so that the photographer, even though an amateur and inexperienced with a camera having an electromagnetic release mechanism will easily recognize where the electric remote control should be connected and he can thus perform photography with the electric remote control release whenever he desires.

According to another aspect of the present invention, there is provided a shutter release mechanism, in which a seat member made of a flexible material is provided between the coupling section for the release means and the release operating member provided internally of the camera, so that any entry of dust through the coupling section is prevented in case neither the cable release nor the remote control release is coupled thereto, with the resulting prevention of any operational failure.

DESCRIPTION OF THE PREFERRED EMBODIMENT

The present invention will now be described in more detail with reference to the accompanying drawings, particularly FIGS. 2 to 5 thereof which illustrate one embodiment of the invention.

Figure 1:
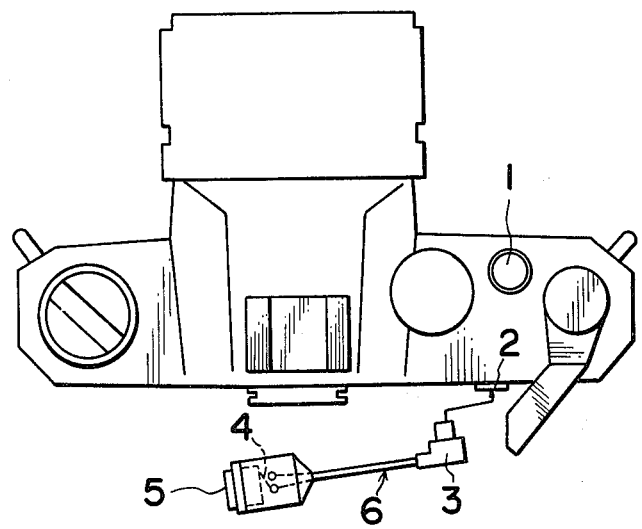
FIG. 1 is a plan view of a prior art electric remote control release device and an associated camera.
Figure 2:
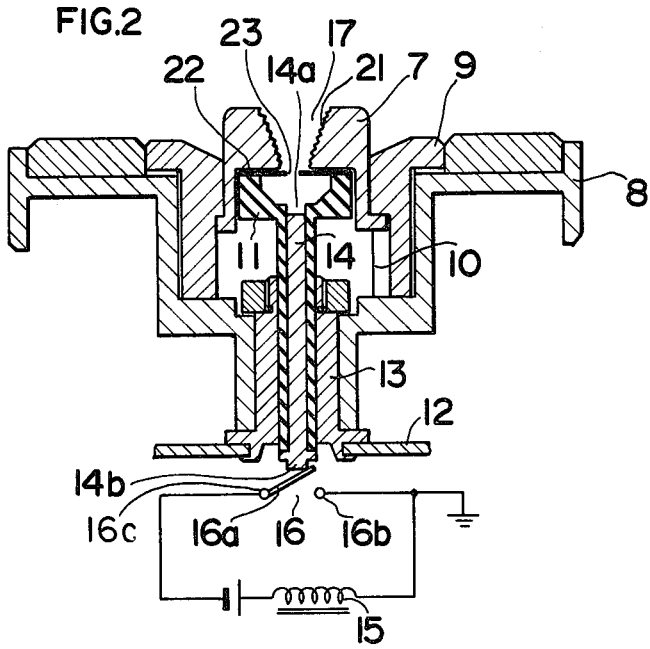
FIG. 2 is a enlarged medial longitudinal cross-sectional view showing one embodiment of the release mechanism according to the present invention.
Figure 3:
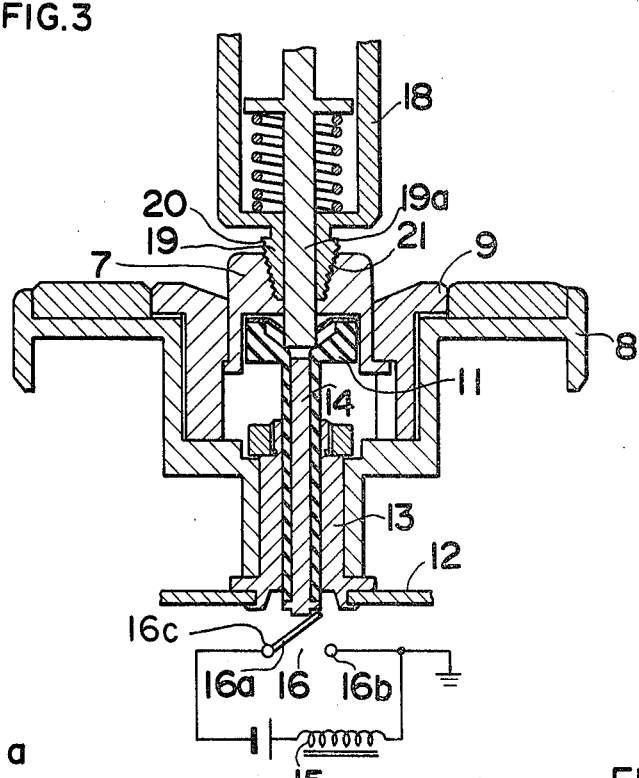
FIG. 3 is an enlarged cross-sectional view of an essential part of a mechanical cable release in use with the mechanism of FIG. 2.
Figure 5:
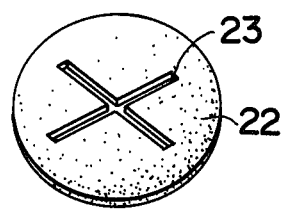
FIG. 5 is an enlarged perspective view of a dust and waterproof seat member forming part of the mechanism according to the present invention.

The reference numeral 7 generally designates a shutter release button, which is movable up and down, and has lower outwardly projecting portions in sliding engagement with vertical slots 10 provided in seat member 9 provided on the body 8 of a camera. A release rod member 11 is made of an electrically insulating material and is movable up and down in a sleeve or collar 13 secured to a supporting plate 12 in relation with the movement of release button 7. An electrically conductive core member 14 is integrally coaxially fitted in the center portion of release rod member 11. The upper end 14a of core member 14 is below the level of the bottom surface of an upper cup-shaped portion of release rod member 11, while the other lower end 14b thereof abuts an actuating member defining movable contact arm or terminal 16a which is permanently connected to a terminal 16c so as to open or close a switch 16 for de-energizing or energizing an electromagnetic releasing magnet 15 provided in the camera body. The other contact or end 16b of switch 16 is grounded to the camera body as shown in FIG. 2, and is electrically connected to the shutter release button 7 via camera body 8 and seat plate 9. Shown at 17 is an attaching portion or socket having a threaded coupling face or recess 21 engageable with the mating threaded portion 20 of the tip portion 19 of a mechanical cable release 18 which is commercially available on the market, as shown in FIG. 3. When the tip portion 19 of mechanical cable release 18 is coupled to attaching portion 17, the bottom end face of release rod 19a is so designed and disposed as to abut the bottom surface of cup-shaped portion of release rod member 11 but not to contact the end 14a of core member 14. A dust and waterproof seat 22 made of a flexible material, is positioned between release button 7 and release rod member 11. As shown in FIG. 5, seat 22 is formed with a central cross-slot 23.

Figure 4:
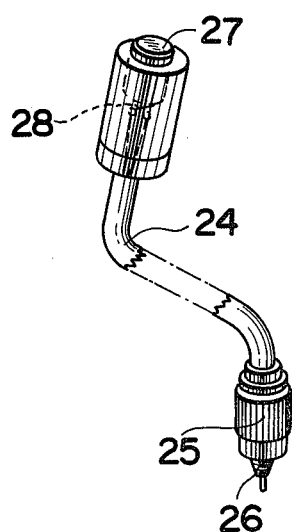
FIG. 4a is a perspective view of an electric remote control release.
FIG. 4b is an enlarged cross-sectional view of an electric remote control release in use with the mechanism of FIG. 2.
FIG. 4c is a circuit diagram of a network associated with the mechanism of FIG. 4b.
Figure 4:
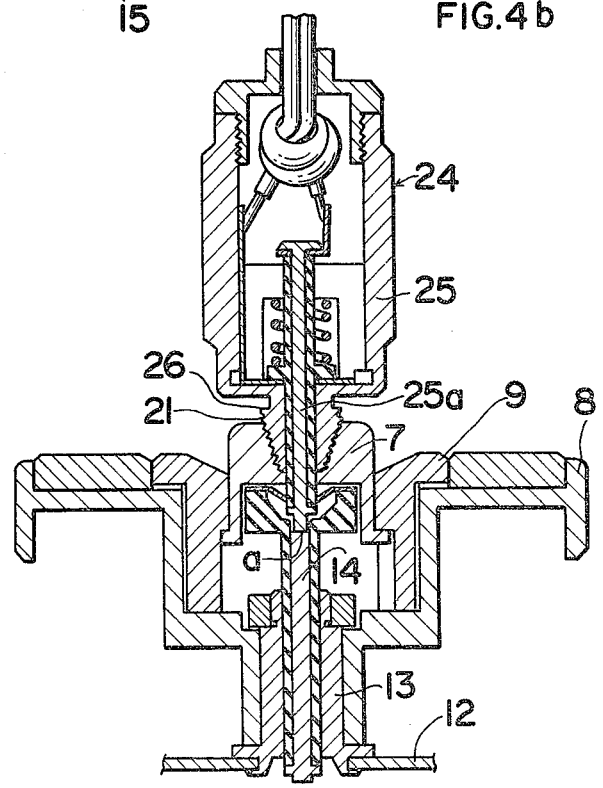
Figure 4C:
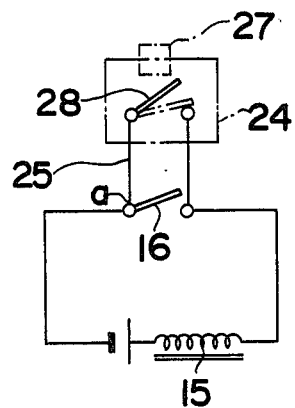

An electric remote control release 24, as seen in FIG. 4 has a tip portion 25 thereof formed with an externally threaded portion 26 engageable with threaded groove 21 in attaching portion 17 provided in the shutter button 7. In addition, when tip portion 25 of electric remote control release is coupled or mounted to attaching portion 17, the outer end or tip face of release rod member 25a provided in tip portion 25 is so designed and disposed as to abut the electrically conductive core member 14, thereby constituting a circuit as shown in FIG. 4c. In this connection, the side portion or peripheral face of release rod member 25a is insulation-coated. A manual operating button 27 for electric remote control release is disposed at the outer end of release 24 and when manual operating button 27 is pushed or depressed, then switch 28 housed or provided internally of the electric remote control release is closed, thereby effecting the operation of electromagnetic releasing magnet 15 provided in the camera body.

Considering now the operation of the shutter release mechanism described above, performing photography by ordinary manual operation, the top flat face of shutter button 7, as shown in FIG. 2, is finger depressed, and then shutter button 7, release rod member 11 and core member 14 are slidingly lowered, thereby closing switch 16, so that electromagnetic releasing magnet 15 is energized or de-energized for starting the operation of a shutter.

When the photography is to be performed with a commercially available mechanical cable release, the threaded portion 20 of the tip portion 19 of the mechanical cable release 18, as shown in FIG. 3, is threaded into threaded recess 21 in the attaching portion 17 of shutter button 7. Then, the lower end face of release rod 19a, which coaxially slidably engages tip portion 19, abuts the top face of release member 11 made of an insulating material. Accordingly, when the cable release is advanced or operated in this condition, then release rod 19a is moved downwards, so that release rod member 11 and core member 14 are lowered so as to close switch 16, and thus effect the operation of magnet 15. In this case however, release rod member 19a remains out of contact with the core member 14, so that no electric problem is experienced.

When photography is to be performed with an electric remote control release 24 as shown in FIG. 4a, the threaded portion 26 of the tip portion 25 of the electric remote control release is screwed into threaded coupling recess 21 in attaching portion 17 of shutter button 7, as shown in FIG. 4b, so that the lower end face of release rod member 25a provided in tip portion 25 contacts the top face of electrically conductive core member 14. As a result, the circuit as shown in FIG. 4c is completed. When the manual operating button 27 is depressed under the above condition, then switch 28 provided therein is closed and hence the circuit is closed, so that magnet 15 is operated.

In case neither the mechanical nor the electric release is attached, then the dust and waterproof seat 22 made of a flexible material, as shown in FIG. 5 interposed between release button 7 and release rod member 11, functions to prevent any ingress of dust into attaching portion 17 of shutter button 7 and hence, any trouble such as a defective contact is prevented.

Figure 6:
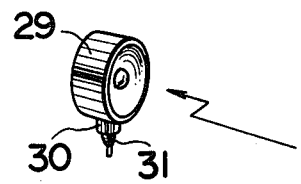
FIG. 6 is a perspective view of a light receiving portion which is another embodiment of the mechanism according to the invention.

Alternatively, as shown in FIG. 6, a threaded portion 31 engageable with threaded recess 21 in shutter button 7 is provided on tip portion 30 of a light receiving and actuating device or switch 29 for the optical wireless remote control thereof, and a pin at the tip thereof is formed in the same manner as the electric remote control release as shown in FIG. 4b so as to cause an internal switch to be closed in response to a predetermined level of light. Then, such light receiving device 29, as well, may be attached to attaching portion 17 of a single shutter button.

As is apparent from the foregoing, a release mechanism of a camera according to the present invention is formed with coupling portion adapted to secure the tip portion of a commercially available mechanical cable release, as well as the tip portion of an electric remote control release, so that error in operation may be prevented, and a simple construction may be achieved, unlike the prior art release mechanism, in which an attaching portion for electric remote control release is separately provided.

While there have been described and illustrated preferred embodiments of the present invention, it is apparent that numerous alternations, omissions and additions may be made without departing from the spirit thereof.

I claim:

1. A shutter release mechanism for use in a camera comprising:

an electromagnetic release circuit including an interconnected electric power source, an electromagnetic means for operating a shutter release member, and a switch for energizing and de-energizing said electromagnetic means, said switch having two terminals and a movable contact member for electrically connecting and disconnecting said two terminals;

a shutter release button, to which is electrically connected one of said terminals, an attaching portion provided in said shutter release button, said attaching portion being formed such that to it may be selectively attached either a mechanical cable release or an electric remote control release which includes a tip portion attachable to said attaching portion, a projecting portion projecting from said tip portion, and an electric switch connected between said tip portion and said projecting portion;

movable means for actuating said movable contact member by means of said shutter release button and said cable release to selectively open and close said switch and including an electrically conductive member electrically insulated from said shutter release button and electrically connected to the other terminal of said switch and including a conductive surface positioned under said attaching portion; and preventing means made of an insulating material, which prevents electric contact of said cable release with said electrically conductive surface when said cable release is attached to said attaching portion, said preventing means allowing the contact of said projecting portion with said electrically conductive surface, when said tip portion of said remote control release is attached to said attaching portion, so that said electromagnetic means may be energized and de-energized by means of the electric switch provided in said remote control release.

2. A shutter release mechanism, as set forth in claim 1, wherein said movable means includes a core member of a rod shape defining said conductive member and movable in an axial direction with said movable means, and wherein said conductive surface of said electrically conductive member is on the upper end surface of said core member.

3. A shutter release mechanism, as set forth in claim 2 wherein said core member is adapted to continuously contact said movable contact in said switch with the lower end portion thereof and is made of an electrically conductive material, thereby electrically connecting said conductive surface with said other terminal for said switch; said core being insulated by insulating means which includes an insulating member which is substantially of a cylindrical shape and which encompasses said core member therewith; said preventing means includes a preventing portion integrally formed with said insulating member, said preventing portion providing a predetermined clearance between said cable release and said core member, when said cable release is attached to said attaching portion and said preventing portion is formed into a shape which allows the direct contact between said remote control release and said core member, when said remote control release is attached to said attaching portion.

4. A shutter release mechanism as set forth in claim 3, wherein said mechanism further includes a dust and waterproof seat formed between said shutter release button and said movable member, said sheet being made of a flexible material.

5. A shutter release mechanism for use in a camera, comprising:
an electromagnetic release circuit including an interconnected electric power source, an electromagnetic means for actuating a shutter release mechanism, and a switch for actuating said electromagnetic means, said switch having first and second terminals and a movable contact member for electrically connecting said terminals;
a shutter release button manually operable for normal shutter releasing operation, said button including an electrically conductive portion connected with said first terminal and further including an adapted receiving portion to which a mechanical cable release and an electric remote control release are selectively attachable with their tip portion, said tip portion of said electric remote control release having an electrically conductive projecting member which projects from the body of the tip portion and which is electrically insulated from the body;
said electric remote control release including a switch having a pair of terminals, one of which is connected to said projecting member and the other to said body of said tip portion;
an electrically conductive member connected with said second terminal of said electromagnetic release circuit, said electrically conductive member being insulated from said release button and disposed to come into contact with said projecting member when said electric remote control release is attached to said shutter release button with its tip portion being electrically connected with said conductive portion of said shutter release button; and
means for actuating said movable contact in response to the operation of either said shutter release button or said cable release when the latter is attached to the button.

6. A camera comprising a body, an electromagnetic shutter release circuit including an interconnected power source, an electromagnetic means for operating a shutter release member and a switch having first and second terminals and an actuating member movable between advanced and retracted positions for opening and closing said terminals, said electromagnetic means being responsive to the opening and closing of said switch terminals, a shutter release button depressably mounted on said body and electrically connected to said switch second terminal and including an axial bore and an exposed remote control cable coupling section, and an electrically conductive slide member engaging said switch actuating member and movable therewith and electrically connected to said switch first terminal and electrically insulated from said release button, depression of said slide member effecting the actuation of said switch actuating member and electrical shunting of said slide member and said release button effecting the closing of said switch terminals.

7. The camera of claim 6 wherein said switch second terminal and said release button are grounded to and electrically interconnected by said camera body.

8. The camera of claim 6 wherein said slide member comprises an axially movable rod having its peripheral face coated with an electrically insulating material.

9. In combination with the camera of claim 6 a remote control electrical release member comprising a coupling member including an electrically conducting head portion releasably coupled to said release button coupling section and an axially projecting electrode insulated from said head portion and slidably projecting through said release button bore into engagement with said slide member, a control switch connected between said head portion and said electrode.

10. The combination of claim 9 wherein said control switch is manually actuatable and further comprising a two conductor electrical cable connecting said control switch between said head portion and said electrode.

11. The combination of claim 9 wherein said control switch is light responsive.

* * * * *